INVENTORS:
GEORGE E. LEMIEUX
RICHARD L. LEONARD
ROBERT L. REYNOLDS
BY
ATTORNEYS

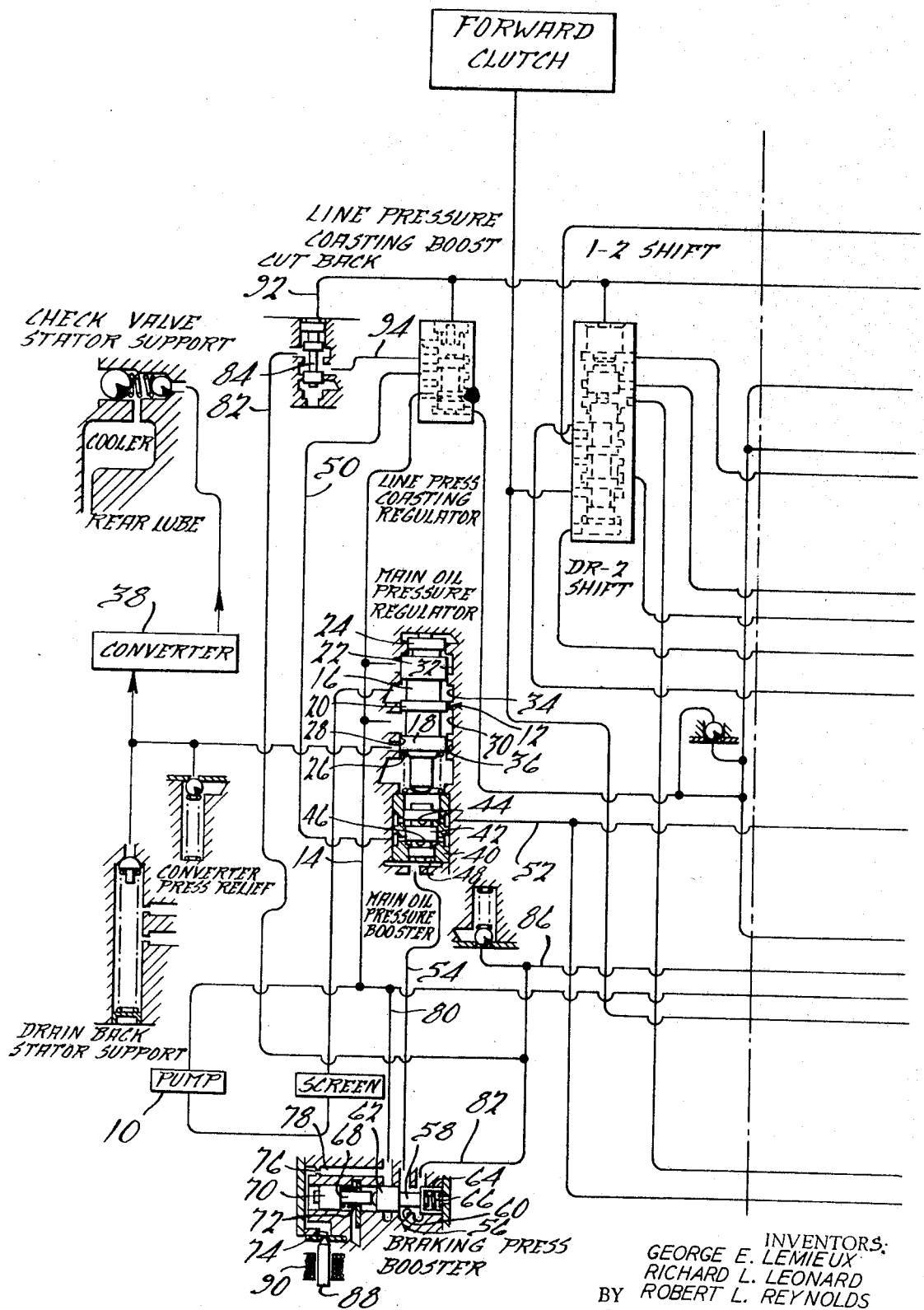

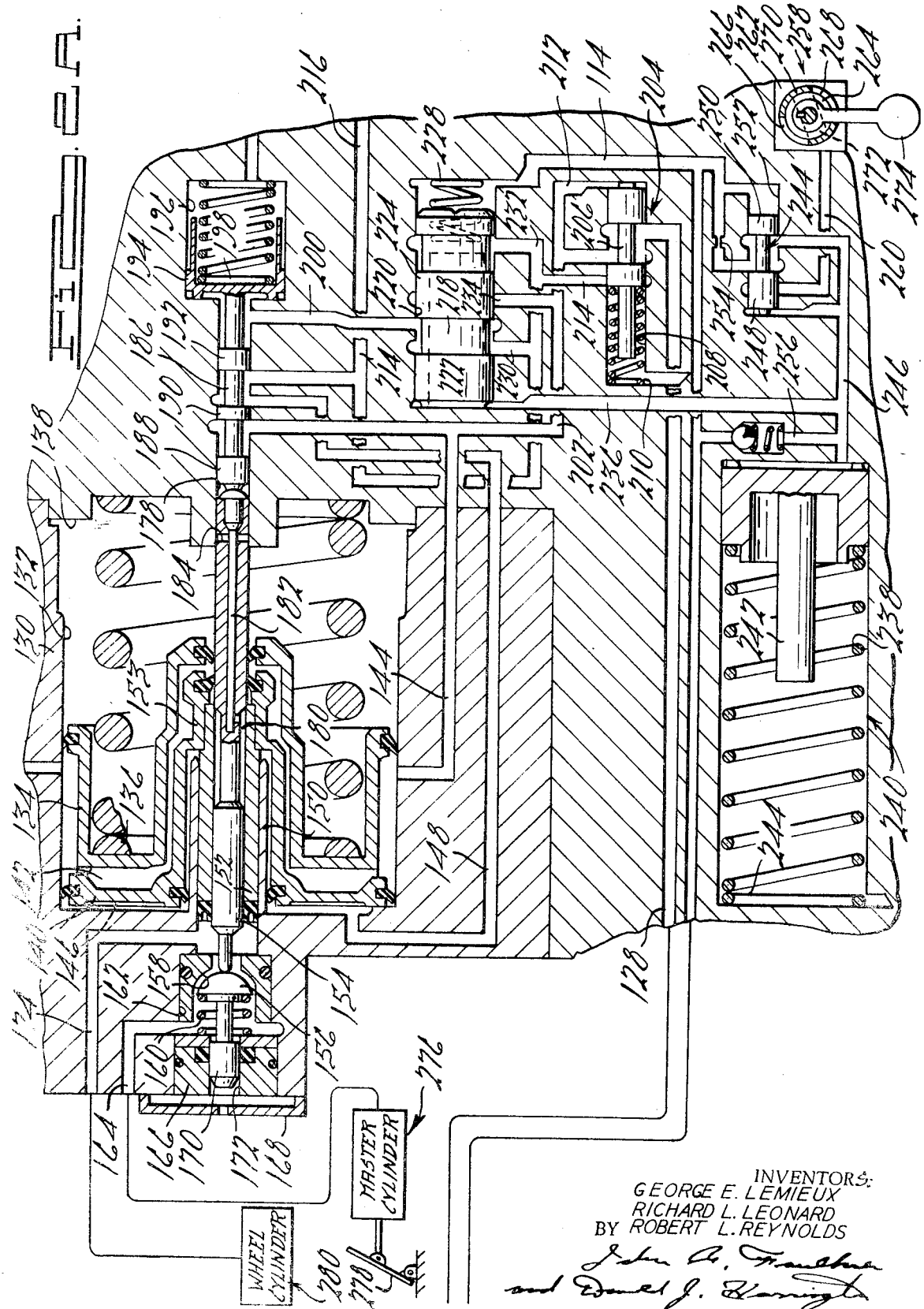

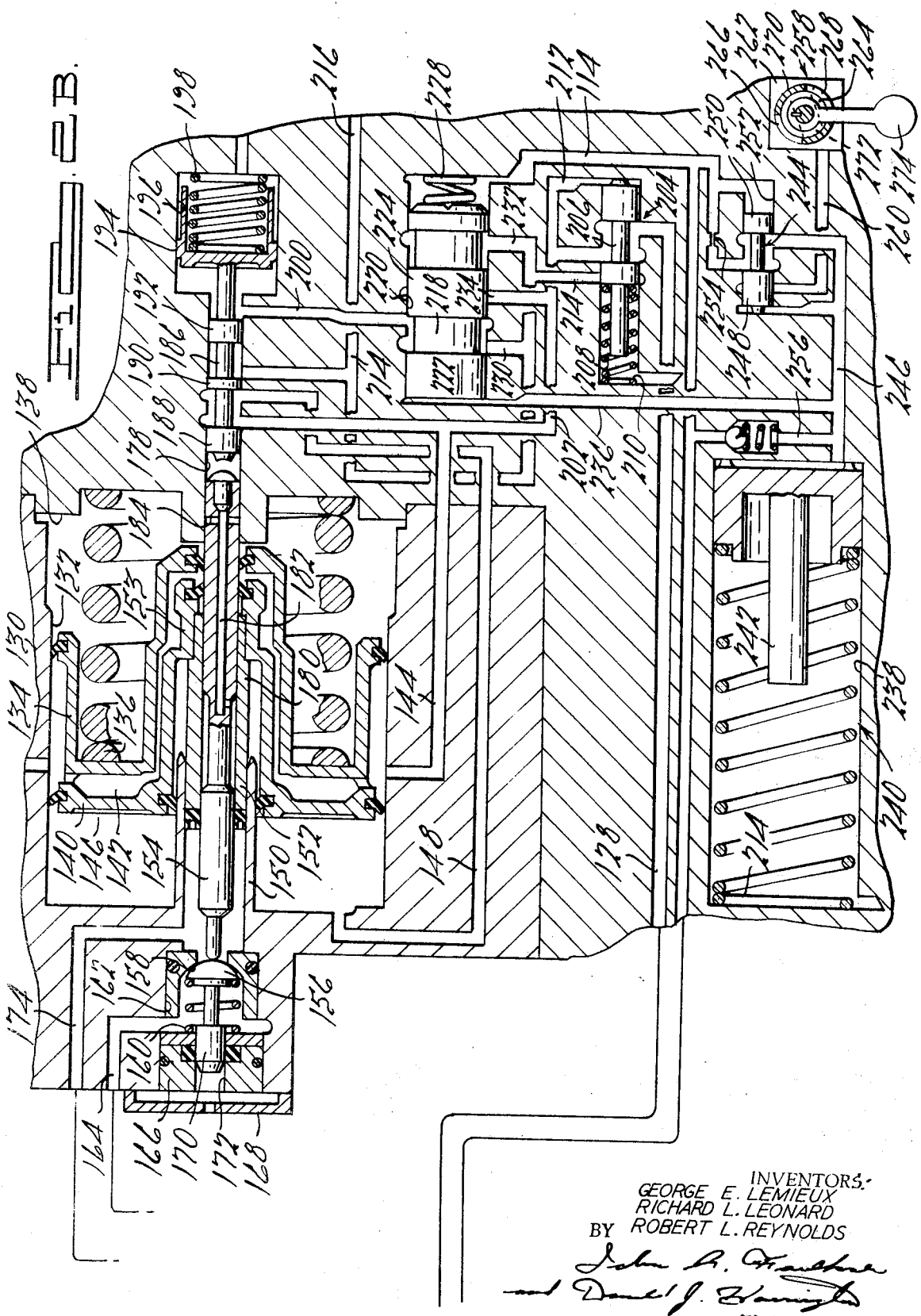

United States Patent Office 3,515,439
Patented June 2, 1970

3,515,439
AUTOMATIC CONTROL CIRCUIT FOR AN ANTI-SKID BRAKING SYSTEM IN AN AUTOMOTIVE VEHICLE DRIVELINE
George E. Lemieux, Dearborn Heights, Richard L. Leonard, Farmington, and Robert L. Reynolds, Detroit, Mich., assignors to Ford Motor Company, Dearborn, Mich., a corporation of Delaware
Filed May 1, 1968, Ser. No. 725,687
Int. Cl. B60t *8/08*
U.S. Cl. 303—21                        21 Claims

ABSTRACT OF THE DISCLOSURE

An anti-skid control for the wheel brakes of an automotive vehicle comprising a wheel brake servo pressure control that senses deceleration of the vehicle and wheel speed, both of these variables inducing a comparator valve to develop a correcting signal for the brake servo pressure control whereby optimum braking action for the vehicle wheels is maintained.

GENERAL DESCRIPTION OF THE INVENTION

The control circuit of our invention employs a vehicle speed signal which may be obtained from the governor valve assembly of a multiple-ratio, automatic, power transmission mechanism situated between a vehicle engine and axle shafts for vehicle traction wheels. The governor valve assembly forms a part of an automatic control valve circuit for controlling ratio shifts in an automatic power transmission mechanism. The control pressure for the anti-skid valve system is obtained from a regulated control pressure source for the automatic power transmission control valve circuit.

The anti-skid control system includes a brake release valve, which functions to relieve pressure applied to the wheel brake cylinders in response to changes in the magnitude of the vehicle speed signal with respect to changes in a second control signal that is proportional in magnitude to the vehicle deceleration. A speed comparator in the control system senses both the vehicle deceleration, which is an indicator of wheel slip, and vehicle speed so that a resultant signal is distributed to brake release valve mechanism to obtain a controlled and constant degree of wheel slip regardless of the braking effort applied by the vehicle operator to the fluid pressure operated wheel brake cylinders.

Both the comparator and the deceleration sensors are subjected to a control pressure obtained from the regulated pressure source for the control system of the automatic power transmission which forms a part of vehicle driveline. When the vehicle speed sensitive signal acting on the speed comparator overcomes the influence of the wheel speed signal, control pressure is distributed to the brake release valve through the speed comparator. At other times the speed comparator exhausts the brake pressure release valve.

When the release valve is exhausted, a fluid connection is established between the driver operated master brake cylinder and the vehicle wheel brake cylinders through the brake release valve. When the speed comparator pressurizes the brake release valve, direct communication between the master cylinder and the wheel brake cylinder is interrupted. At the same time, pressure is distributed to a pressure movable element of the brake pressure release valve assembly thereby causing a wheel brake cylinder pressure compensating adjustment of a pressure-relieving piston that is in fluid communication with a passage leading to the wheel brake cylinders. The wheel brake cylinder pressure then tends to decrease to a value that is sufficient to avoid skidding of the vehicle traction wheels.

The speed comparator can be calibrated so that the maximum pressure made available to the wheel brake cylinders through the release valve will never exceed that pressure that will cause wheel slippage in excess of a predetermined amount such as 12½%.

The pressure-relieving piston which compensates for an excessive increase in pressure in the wheel brake cylinders, is subjected to a normal preload to permit at least a minimum braking pressure to develop in the wheel brake cylinders when the vehicle engine is inactive and control pressure is not made available by the transmission control pump.

Since the anti-skid brake system requires the presence of a reliable wheel speed signal at high speeds when the engine carburetor throttle is closed, provision is made for augmenting the circuit pressure. Under these conditions the governor will be capable of developing a signal of adequate magnitude. This is done by using a braking pressure boost valve in the main transmission regulator valve system. The boost valve is rendered active when a solenoid controlled valve orifice is opened or closed. The solenoid circuit for this latter valve includes a brake pedal operated switch so that the boost occurs only when the vehicle operator applies foot pressure to the vehicle brake pedal.

BRIEF DESCRIPTION OF THE FIGURES OF THE DRAWING

FIGS. 1A and 1B show a portion of an automatic power transmission control system with a braking pressure boost valve assembly and a main regulator valve assembly for use with the anti-skid brake system of our invention.

FIGS. 2A and 2B show a schematic diagram of other portions of the circuit of FIG. 1, which includes a brake pressure release valve and other elements of the anti-skid brake system of our invention. FIG. 2A shows the position of the valve elements durng normal braking, and FIG. 2B shows the same elements when they provide an anti-skid function.

PARTICULAR DESCRIPTION OF THE INVENTION

Figure 1B:
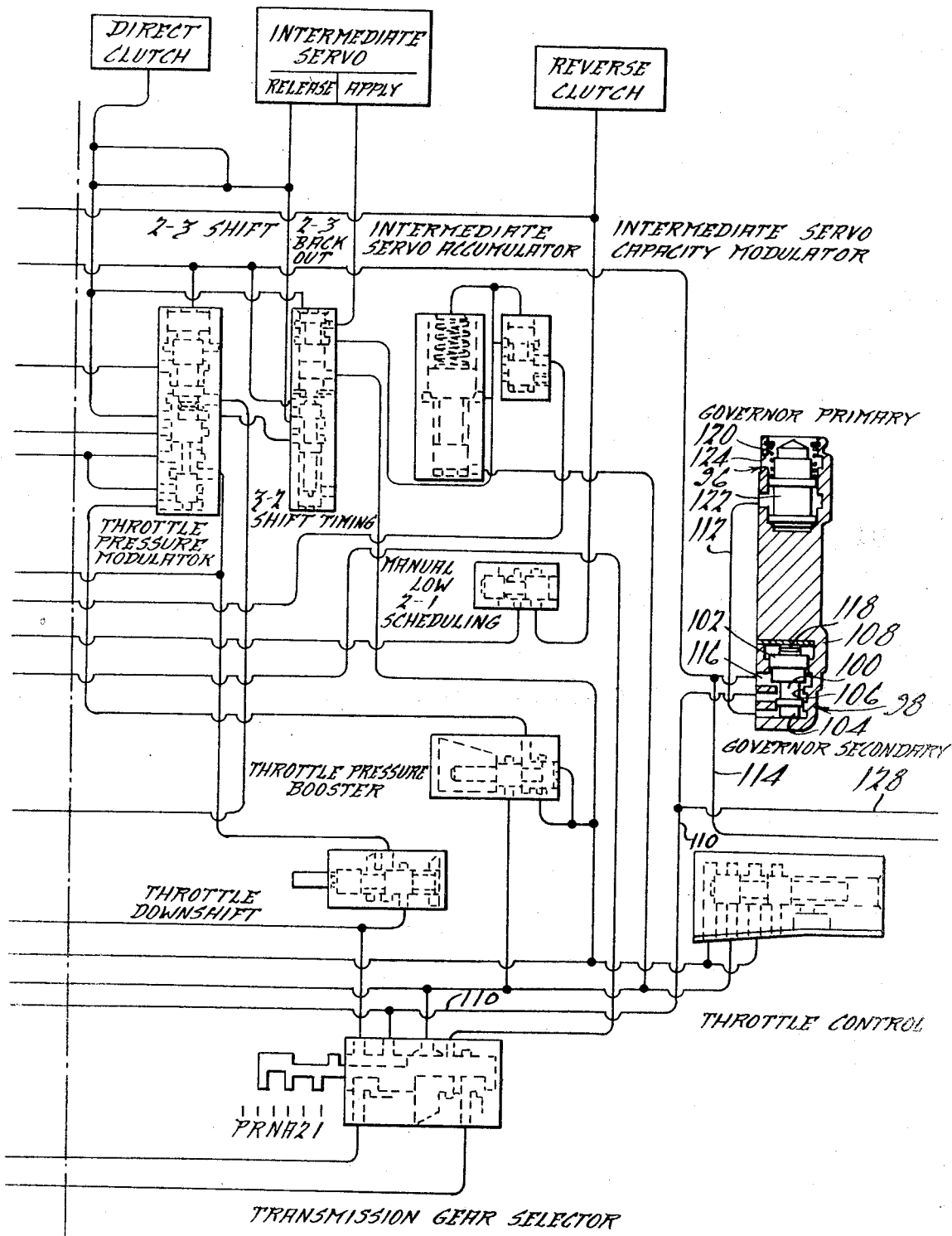

In FIGS. 1A and 1B, numeral 10 designates schematically a positive displacement pump driven by the vehicle engine directly. Numeral 12 designates a main oil pressure regulator valve which is adapted to regulate the output pressure of the pump 10. It is connected directly to pump 10 through a high pressure supply passage 14.

Regulator 12 includes a valve spool 16 on which is formed spaced valve lands 18, 20, 22 and 24. Spool 16 is biased in an upward direction by valve spring 26. External valve lands on the spool 16 register with cooperating internal lands in valve chamber 28.

Passage 14 communicates with chamber 28 through axially spaced valve ports 30 and 32. An exhaust port 34 is situated between the ports 30 and 32. A converter pressure feed port 36 communicates with the chamber 28 at location adjacent land 18.

The pressure passage 14 acts on the differential area of lands 24 and 22 thereby tending to move the spool 16 against the opposing force of spring 26. This progressively increases the degree of communication between port 30 and converter feed pressure port 36. The torque converter, which is shown schematically at 38, thus is supplied with hydrokinetic fluid as the vehicle engine is started. Upon a continued pressure build-up in passage 14, port 34 is brought into communication with port 30. The magnitude of the pressure that is maintained in passage 14 then depends upon the load of the spring 36.

At the lower end of the valve chamber 28 is a valve sleeve 40. Located in the valve sleeve 40 is a main oil pressure booster valve element 42 having spaced valve lands thereon which define a pair of differential areas 44 and 46. A third control area 48 is located at the lower end of the booster valve element.

Differential area 44 is pressurized when the transmission manual valve shown schematically in FIG. 2 is moved to the reverse drive position. The fluid pressure force on the main oil pressure booster valve then supplements the force of the spring 26 to provide an increased regulated line pressure in passage 14.

Throttle valve pressure, which is an indicator of engine torque capacity, is distributed to the differential area 46 through a throttle pressure passage 50. The corresponding passage for area 44 is shown at 52.

Pressure distribution to control area 48 occurs through passage 54. This extends to braking pressure boost valve 56, which includes a valve element 58 slidably positioned in valve chamber 60. Valve element 58 includes spaced valve lands 62 and 64. It is urged in a left-hand direction, as viewed in FIG. 1, by valve spring 66. Braking pressure boost valve 56 includes also a second valve element 68 situated in the chamber 60. It includes a single diameter valve land 70, which is biased in a left-hand direction by valve spring 72. The left-hand side of the land 70 communicates with an exhaust port 74. It communicates also with the downstream side of a control orifice 76 located in pressure passage 78. This passage in turn communicates with main regulator line pressure passage 14 through passage 80.

Valve chamber 60 communicates with exhaust passage 82. This passage in turn extends to a cutback valve 84. Passage 82 is subjected to throttle pressure which is distributed to it through throttle pressure passage 86. This same throttle pressure in passage 86 is distributed through passage 82 to passage 54 through the valve chamber 60 when the valve element 58 assumes the position shown in FIG. 1. The main oil pressure booster thus is subjected to throttle pressure to cause an increase in the magnitude of the regulated pressure as the engine torque is increased.

Exhaust port 74 is opened and closed by a solenoid operated valve element 88. Solenoid windings 90 cause the valve element 88 to advance and retract with respect to the port 74. It is advanced when solenoid windings 90 are energized and it is retracted under the influence of a spring, not shown, when the windings 90 are deactivated.

When the valve element 88 blocks the port 74, a pressure build-up occurs on the left-hand side of valve element 68 thereby causing valve element 68 to assume the position shown wherein passage 82 is brought into communication with passage 54. When the valve port 74 is unblocked, however, passage 54 is brought into communication with control pressure passage 80, which results in a boost in the regulated output pressure maintained by regulator 12.

The solenoid windings 90 can be energized whenever the vehicle operator applies foot pressure to the vehicle brake pedal to apply the vehicle wheel brakes. Normally, during operation of the vehicle at advanced speeds, passage 82 is exhausted through the cutback valve. The latter is subjected to governor pressure, which is distributed to it through passage 92. When the influence of throttle pressure in passage 82 acting in an upward direction on the valve element 84 is overcome by the influence of governor pressure, valve element 84 is shifted downwardly thereby blocking passage 82 and interrupting communication between passage 82 and passage 94. Passage 94 is exhausted by the line pressure coasting regulator valve when the latter is in a downward position, as shown in FIG. 1A, and it is connected to throttle pressure passage 50 when the line pressure coasting regulator valve is in an upward position.

The governor assembly shown in FIG. 2 includes a primary governor and a secondary governor. These are designated by reference characters 96 and 98, respectively. The secondary governor valve includes a valve element 100 with two space valve lands 102 and 104. It is slidably situated in valve chamber 106 formed in the governor valve body 108. Control pressure passage 110, which communicates with the previously described control pressure passage 14 through the transmission gear selector or manual valve, distributes control pressure to the primary governor 98. The radially outward end of valve element 100 communicates with exhaust passage 112, and the output pressure passage 114 for the governor assembly communicates with output pressure port 116, which is in fluid communication with the differential area defined by lands 102 and 104. The pressure force acting on the differential area is opposed by valve spring 118.

Exhaust passage 112 is opened and closed by the primary governor. When the primary governor is in a radially inward position and is held in that position by valve spring 120, exhaust port 112 is blocked. When the valve body 108 rotates at a speed greater than a predetermined value, however, the primary valve element 122 will move in a radially outward direction, thereby establishing communication between passage 112 and exhaust port 124. At that time the secondary governor valve element will begin to modulate the pressure in passage 110 to produce a resultant pressure in passage 114 that is an indicator of vehicle speed.

Governor valve body 98 is drivably connected to power transmission driven shaft which in turn is positively connected through a differential gear-and-axle assembly to the vehicle traction wheels.

Shown in FIGS. 2A and 2B is an anti-skid brake pressure release valve 126. Boosted control pressure from the main pressure regulator is distributed to the brake pressure release valve 126 through pressure passage 128, which communicates with the passage 110 indicated in FIGS. 2A and 2B. Passage 110, as mentioned earlier, communicates with the main pressure passage 14 through the manual valve.

The brake pressure release valve comprises a valve body 130 in which is formed a control cylinder 132. Slidably situated in the control cylinder 132 is a control piston 134, which is biased by means of a valve spring 136 in a left-hand direction. Valve spring 136 is seated on an end cover plate 138 secured to the body 130 at one end of the cylinder 132. Located also in the cylinder 132 at the left-hand side thereof is a second control piston 140. This cooperates with the piston 134 to define a preload pressure chamber 142. This chamber is in fluid communication with the supply passage 144 formed in the body 130.

Piston 140 cooperates with the cylinder 132 to define also a second control pressure chamber 146, which is in fluid communication with the pressure supply passage 148 also formed in the body 130.

The body 130 is provided with a relatively stationary valve sleeve 150 situated concentrifugally with respect to the cylinder 132 and extending axially therein slidably. Situated in the sleeve 150 is a pressure compensating valve sleeve 152. This is connected positively to the hub 153 of a second control piston 140.

Slidably situated within the valve sleeve 152 is a valve stem 154. This is adapted to engage at its left-hand end a one-way check valve element 156, which normally is seated on a valve seat 158 by valve spring 160. Valve seat 158 is located at the right-hand end of a check valve chamber 162 which communicates with passage 164 formed on the body 130. This passage extends to a vehicle brake master cylinder, which can be pressurized by the vehicle operator as he depresses the vehicle brake pedal in the usual fashion. The left-hand end of the chamber 162 is closed by a closure element 166 over which is positioned valve plate 168 with a centrally located exhaust orifice. A stem 170 on the check valve element 156 is slidably positioned in a central pilot opening 172 formed in the closure element 166.

The space between the valve seat 158 and the left-hand end of the valve sleeve 152 is in fluid communication with passage 174. This extends to the vehicle wheel brake cylinders. When the valve 156 is off the seat 158, communication is established between the master brake cylinder passage 164 and wheel brake cylinder passage 174. Communication is interrupted between these passages, however, when the valve element 156 is seated against its seat 158.

Valve stem 154 extends through valve openings formed in the hub 153 of the piston 140 and in the adjacent hub 176 of the control piston 134. The right-hand end of the stem 154 is slidably received within valve chamber 178 formed in the end closure member 138. The fluid pressure that is displaced from the right-hand side of the piston 134 as the latter is stroked in the right-hand direction is transferred through open orifice 184, and through passages 182 and 180 to the left-hand side of the piston 140.

A valve spool 186 is slidably positioned in the valve chamber 178. It is formed with three valve lands 188, 190 and 192. Its right-hand end is connected to control piston 194, which is slidably received within control cylinder 196. Piston 194 is urged normally in a left-hand direction by control spring 198. The right-hand side of the piston 194 is exhausted through an exhaust port, as indicated. The left-hand side of the piston 194 cooperates with a cylinder 196 to define a pressure chamber that is in continuous fluid communication with a control pressure passage 200.

Control pressure passage 202 communicates with the chamber 178 at a location adjacent land 188. This passage in turn communicates with control pressure supply passage 128 through an anti-skid regulator 204. This comprises a simple regulator valve element 206 positioned in the regulator valve chamber 208. Element 206 is urged in the right-hand direction, as viewed in FIG. 2, by valve spring 210. Feedback pressure acts on the right-hand side of the valve element 206 through feedback pressure passage 212. This communicates with passage 202. Exhaust passage 214 also communicates with the chamber 208. The resultant pressure in passage 202 then is determined by the calibration of the spring 210.

Passage 202 communicates with exhaust port 216 formed in the valve body 138. This same exhaust port 216 communicates also with right-hand side of the piston 134.

Passage 148, which communicates with the left-hand side of the piston 140, extends to the valve chamber 178 at a location adjacent land 190. When the valve element 186 is urged in a right-hand direction, communication is established between passage 148 and passage 202. When the valve element 186 is urged in a left-hand direction, however, passage 144 becomes blocked and passage 148 becomes connected to the exhaust passage 214.

A wheel slip control valve element 218 is slidably situated in valve chamber 220. It includes three space valve lands 222, 224 and 226. These register with internal valve lands in the chamber 220. Valve element 224 is urged normally in a left-hand direction, as viewed in FIGS. 2A and 2B, by valve spring 228. The right-hand side of the valve element 218 is subjected to governor pressure distributed thereto through passage 114. A pair of exhaust ports 230 and 232 is located in the chamber 220 on opposite sides of passage 234, the latter communicating with the passage 202. The left-hand side of the wheel slip control valve element 218 is in fluid communication with passage 236, which communicates with one side of cylinder 238 for an accumulator 240. The accumulator includes a piston 242, which is subjected to the force of an accumulator spring 244.

An orifice switch valve 244 establishes a connection between governor pressure passage 114 and passage 246, which extends to the accumulator passage 236. Switch valve 244 comprises a valve element having a pair of lands 248 and 250 slidably situated in the valve chamber 252. The right-hand side of the valve chamber 252 communicates with passage 114, which is subjected to governor pressure. Communication is established between passage 114 and passage 246 through the valve chamber 252. A fluid flow restriction 254 is provided in the passage 114. Passage 114 communicates also with the right-hand side of the chamber 252. The left-hand side of the chamber 252 communicates with passage 246.

A one-way flow passage 256 connects passage 114 with passage 236, thereby enabling the accumulator cylinder 238 to be charged with governor pressure. A one-way flow check valve is situated in the passage 256.

A deceleration sensor 258 communicates with the orifice switch valve through passage 260. When the valve 244 is in the position shown, land 248 blocks the passage 260.

In the embodiment shown in FIGS. 2A and 2B, the deceleration sensor is inthe form of a deceleration sensitive variable orifice although we expect that other forms of deceleration sensors can be used as well. The sensor 258 includes a valve body 262 in which is positioned a rotary valve element 264. Passage 260 communicates with arcuate recesses 266 and 268 surrounding the valve element 264. The recesses 266 and 268 are formed in a valve sleeve which slidably seals the valve element 264, as indicated at 270. A radial opening 272 in the valve element 264 registers with the sealing portions of the sleeve to provide a variable restriction, the degree of restriction being dependent upon the angular position of valve element 264 with respect to the valve body 262. An inertia mass 264 is connected directly to the valve element 264.

The inertia mass 264 is adapted to oscillate about the axis of valve element 264 in response to acceleration forces acting in the direction of the motion of the vehicle.

The master brake cylinder for the wheel brakes is identified schematically at 276. It can be pressurized by the vehicle operator by means of a conventional brake pedal 278. The wheel brake cylinders, one of which is located at each vehicle wheel, are identified generally by reference character 280. Master brake cylinder 276 is in fluid communication with passage 164, and the wheel brake cylinder 280 is in fluid communication with passage 174.

When the vehicle operator applies the wheel brakes, the circuit for solenoid windings 90 is closed. This opens the orifice 74, which results in distribution of control pressure from passage 80 to passage 54. This in turn increases the regulated pressure level maintained by the main oil pressure regulator in the manner described previously.

Initially, the control piston 194 is in a left-hand position. This causes valve element 186 to engage the valve stem 154 thereby shifting the latter in a left-hand direction to unseat the one-way check valve 156. This establishes fluid communication between passages 164 and 174. Thus the master brake cylinder pressure is distributed directly to the wheel cylinders without interruption.

Control pressure, which is regulated by the anti-skid system regulator if such regulation is desired, is distributed to passage 202 and into the left-hand side of the piston 134 through passage 144. As soon as the engine is started, the pressure chamber 142 becomes pressurized. This will cause the piston 134 to stroke against the force of spring 136 until it bottoms against the valve body 138, which acts as a closure wall for the cylinder 132. The force of this pressure on the piston 140 acts as a preload which will maintain the sleeve 152 in a stationary position relative to the valve body 130 as pressure builds up in the passage 174.

Pressure chamber 146 at this time communicates with exhaust port 216 through passage 148 and through the valve chamber 178.

When the vehicle decelerates as braking continues, the governor pressure acting on the right-hand side of the speed comparator or wheel slip control valve element 218 will decrease. If normal braking action occurs, the pressure in passage 36, which acts on the left-hand side of the speed comparator or wheel slip control valve element 218, also will decrease. This occurs because deceleration of the vehicle will cause the valve element 264 to rotate thereby uncovering the orifices 270. This will tend to establish restricted communication between passage 260 and the exhaust region. Any tendency for the valve 244 to shift in the right-hand direction upon a decrease in governor pressure acting on the right-hand side thereof will be accompanied by discharge of fluid from the accumulator and from the passage 246 through the partially exhausted passage 260. This will result in a decrease in the pressure acting on the left-hand side of the valve element 218 so that the valve element 218 will assume the position shown in FIG. 2. At this time the brake pressure release valve has not been actuated.

If wheel slippage occurs during the braking action, a decrease in governor pressure due to a reduction in the speed of the transmission tailshaft will not be accompanied by a corresponding reduction in vehicle speed. Thus the relative magnitude of the deceleration forces will not be sufficient to increase the opening of exhaust port 270 to avoid a pressure build-up in passage 236. Thus a pressure build up will occur on the left-hand side of the speed comparator relative to the pressure that exists on the right-hand side. The speed comparator valve element 218 then will shift in a right-hand direction to establish communication between passage 234 and passage 200 while interrupting communication between passage 200 and the exhaust port 230. This will result in distribution of control pressure to the left-hand side of the control piston 194 thereby shifting the latter in a right-hand direction against the force of spring 198. This will interrupt communication between passage 148 and the exhaust port 216 while at the same time establishing communication between the passage 148 and the control pressure passage 202 through the brake release valve chamber 178. Pressure chamber 146 now becomes pressurized. This in effect results in a loss in the preload acting on the sleeve 152. Thus the build-up in pressure passage 174 will be accompanied by an increase in volume made available to the fluid acting on the wheel brake cylinders.

In the particular embodiment shown, only the rear wheel brake cylinders are connected to the passage 174. The front wheel brake cylinders are connected to the master cylinder through a separate isolated brake pressure passage.

The sleeve 152 becomes displaced to reduce the braking pressure at the wheel brake cylinders until slippage ceases. When this occurs the forces that balance the speed comparator valve element 218 become stabilized once more so that the valve element 218 will shift in a left-hand direction. The sensor 258 and the speed comparator 218 can be calibrated so that the speed comparator will shift whenever the wheel slippage exceeds 12½%, or some other desired value for wheel slippage.

As the piston 140 is stroked in a right-hand direction, fluid is displaced from the chamber 142 to the chamber 146 through the passage 144, through the valve chamber 178 and through the passage 148.

Figure 3:
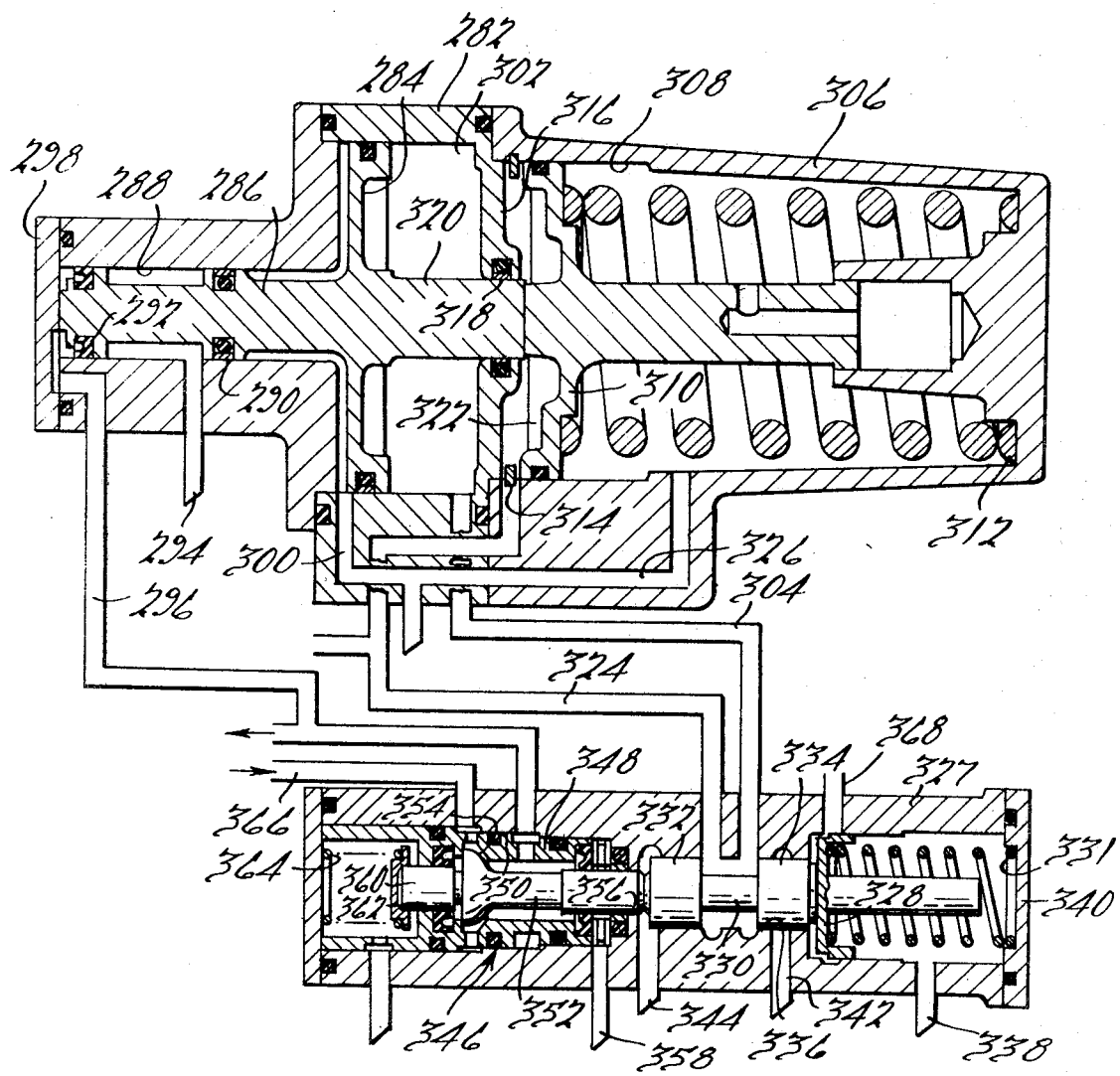
FIG. 3 is a view similar to FIG. 2A although it shows a modified circuit for the anti-skid valve elements.

In the modified construction of FIG. 3, the two pistons of the brake pressure release valve are separated from the one-way shift valve and from the control piston and are located in a separate valve body.

The FIG. 3 construction includes a cylinder 282 in which is positioned piston 284, which is carried by or formed integrally with valve element 286.

Valve element 286 is slidably situated in chamber 288 formed in a valve body that is secured to the end of the cylinder 282. A pair of annular seals 290 and 292 surround the valve element 286. The region between the seals 290 and 292 communicates with exhaust port 294, which extends to the ground. This avoids mixing of the brake fluids with the transmission fluids since any leakage across seals 290 and 292 is not mixed but discharged to the ground through the port 294. Passage 296, which corresponds to the previously described passage 174, extends ot the rear wheel brake cylinders and communicates with the left-hand side of the valve element 286.

Valve chamber 288 is closed by a closure plate 298, which is apertured to provide communication between passage 296 and the left-hand side of the chamber 288. The left-hand side of the piston 284 is exhausted through exhaust passage 300. There is no counterpart, therefore, for the chamber 146 in the FIG. 3 construction. Piston 284 cooperates with the cylinder 282 to define a pressure cavity 302 which communicates with passage 304.

A housing extension 306 defines another cylinder 308 in which is positioned a preload piston 310. A valve spring 312 seated on the end of the extension 306 acts on the piston 310 normally to urge the latter in a left-hand direction. Its limiting position is determined by snap ring 314.

Cylinder housing 292 is formed with an end wall 316 having a central opening 318 which receives extension 320 of the piston 284. Wall 316 and the piston 310 define a pressure cavity 322, which is in fluid communication with line pressure passage 324. This passage corresponds to the previously described passage 128. The region on the right-hand side of the piston 310 within the housing extension 306 is exhausted through exhaust passage 326.

The release valve body 327, which is separate from the cylinder housing 282, includes a valve spool 330 having space valve lands 332 and 334. It is slidably positioned in valve chamber 336 and is connected to control piston 328. This piston is urged in the left-hand direction, as viewed in FIG. 3, by valve spring 331. Piston 328 is located in a large diameter cylinder portion of the chamber 336. The space occupied by the spring 330 is exhausted through exhaust port 338. The end of the spring chamber is closed by closure member 340, on which the spring 330 is seated.

An exhaust port 342 communicates with chamber 336. It normally is blocked by a land 334 when the valve spool 330 assumes the position shown. Line pressure passage 324 is brought into communication with passage 304 through the valve chamber 306 when the valve spool 330 assumes a left-hand position. Passage 324 is blocked by land 332, however, when the valve spool 330 is shifted in the right-hand direction as passage 304 is exhausted through the port 342. The left-hand end of the valve chamber 336 is exhausted through port 344.

One way check valve 346 is situated in alignment with valve element 330. It includes a valve seat in the form of a sleeve 348 located in the valve chamber 350. Check valve element 352 is located in the sleeve 348. It includes a circular sealing surface 354, which engages a cooperating seat in the sleeve 348. The right-hand end of the valve element 352 is slidably positioned in a reduced diameter portion 356 of the valve chamber 350. Fluid seals are provided in a reduced diameter portion as indicated. The location intermediate the seals at this point communicates with exhaust port 358 which extends to the ground, thereby avoiding mixing of the transmission fluid and the brake fluid. Valve element 352 includes also an extension 360 slidably received within central valve opening 362 in the sleeve 348. An annular seal surrounds extension 360 at this location.

Valve spring 364 acts on the end of the valve element 352 to urge it normally into a closed position.

When the valve element 352 is in the open position, free communication is established between master brake cylinder pressure line 366 and the rear wheel brake pressure line 296. Line 366 corresponds to line 164 described with reference to the FIG. 2.

When the control piston 328 is in a left-hand position, valve element 352 is held in the open position. When fluid pressure is admitted to the left-hand side of the control piston 328, the valve element 352 will close under the influence of spring 364 and passage 304 will be brought into communication with the exhaust port 302. At the same time passage 324 is blocked by land 332. Fluid pressure is admitted to the left-hand side of control piston 328 through port 368, which communicates with the speed comparator wheel slip control valve. This port 368 corresponds to passage 200 in the embodiment of FIG. 2.

When the vehicle operator applies the wheel brakes, pressure is distributed from the master cylinder to the wheel brake cylinders through the open valve 346. As soon as the engine is started, line pressure is distributed from the transmission pump, through passage 324, and through valve chamber 336 to the passage 304. This causes pressure chamber 302 to become pressurized with line pressure. The left-hand side of the piston 284 is exhausted continuously. Line pressure is distributed at all times after the engine is running to the pressure chamber 322 on the left-hand side of the preload piston 310. This strokes the piston 310 against the force of spring 312. The presence of the pressure in chamber 322 will create a residual force on the reduced diameter stem 320 of the piston 284 thereby maintaining a residual brake pressure in the wheel brake cylinders. This tends to overcome slack in the brake system, but it is not sufficient to overcome the force of the brake cylinder springs to cause dragging of the friction elements of the wheel brakes.

The sensing portion on the circuit may be the same as that of the FIG. 2A construction. The speed comparator and the deceleration sensor can be calibrated to produce a signal for the control piston 328 only when the slippage of the vehicle wheels exceeds a precalibrated value such as 12½%. When slippage does occur, valve element 330 is shifted in a right-hand direction thereby exhausting passage 304. This causes the pressure in chamber 302 to fall. At that time the reaction force on the valve element 286 is insufficient to maintain the valve element 286 in a stationary position against the opposing force of the pressure in the wheel brake cylinder pressure line 296. Thus the piston 286 will shift in a right-hand direction thereby increasing the volume that is available for the fluid in the wheel brake cylinders. This decreases the effective pressure in the wheel brake cylinders to a value that is sufficient to eliminate the slipping of the vehicle wheels. When the desired braking effort is achieved, the speed comparator again will shift as described previously, thereby again exhausting the left hand side of the control piston 328. The piston 284 then will be shifted again to the position shown in FIG. 3 as normal vehicle braking continues.

The spring 312 of the FIG. 3 construction and the spring 136 of the FIG. 2A construction are intended to provide a reaction preload for the wheel brake cylinders when the vehicle engine is stopped and no reaction pressure is made available to the chambers 302 or 142. The springs may be designed so that they will stroke at some precalibrated value, such as the value that corresponds to 1300 p.s.i. wheel brake pressure.

In the FIG. 3 construction no attempt is made to recirculate the fluid from the right-hand side of the piston 284 to the left-hand side as the piston 284 is stroked. This reduces flow losses because of the shorter and more direct feed lines.

Having thus described preferred forms of our invention, what we claim and desire to secure by U.S. Letters Patent is:

1. An anti-skid brake system for a wheeled vehicle having an engine and a driveline connecting drivably the engine and the vehicle wheels, a master brake cylinder under the control of the vehicle operator, fluid pressure operated wheel brakes, a brake pressure passage between said master cylinder and said wheel brakes, a brake release valve comprising a pressure movable member, a pressure compensating element in fluid communication with said brake pressure passage and connected to said movable member, a fluid pressure source, a hydraulic connection between said pressure source and one side of said movable member, release valve means situated in and partly defining said hydraulic connection for selectively pressurizing and exhausting one side of said movable member, an actuator for said release valve means, a speed comparator, said speed comparator forming in part a fluid connection between said actuator and said pressure source, a source of a pressure signal that is proportional in magnitude to the driven speed of said driveline, a speed signal passage extending from said speed signal source to one side of said speed comparator, a source of a pressure signal that is proportional in magnitude to deceleration of said vehicle, a pressure passage extending from said deceleration signal source to the other side of said speed comparator, said speed comparator being shifted from one position to the other depending upon the ratio of the signal forces acting therein, and a source of control pressure in fluid communication with said actuator through said speed comparator whereby actuating pressure is distributed to said actuator when said speed comparator assumes one operating position and wherein said actuator is exhausted when said speed comparator assumes its other operating position.

2. The combination as set forth in claim 1 wherein said deceleration signal source comprises an accumulator, a fluid connection between said speed signal source and said accumulator for charging the latter with fluid pressure, a connection between one side of said speed comparator and said accumulator, said vehicle deceleration signal source comprising valve means for varying the magnitude of the pressure made available by said accumulator to said speed comparator whereby the influence of the pressure in said accumulator on said speed comparator overcomes the influence of said speed signal thereon when wheel slippage during braking exceeds a desired value.

3. The combination as set forth in claim 2 wherein said speed comparator assumes a first operating position when the influence of said speed signal overrules the influence of the pressure in said accumulator and wherein said speed comparator assumes a second position when the pressure in said accumulator overrules the influence of said speed signal, said speed comparator blocking communication between said control pressure source and said actuator when it assumes said first position and establishing communication between said actuator and said control pressure source when it assumes a second position.

4. The combination as set forth in claim 1 including means for establishing a preload on said movable member which tends to oppose movement of said pressure compensating element under the influence of the wheel brake pressure when the wheel brake pressure is below a predetermined value.

5. The combination as set forth in claim 2 including means for establishing a preload on said movable member which tends to oppose movement of said pressure compensating element under the influence of the wheel brake pressure when the wheel brake pressure is below a predetermined value.

6. The combination as set forth in claim 3 including means for establishing a preload on said movable member which tends to oppose movement of said pressure compensating element under the influence of the wheel brake pressure when the wheel brake pressure is below a predetermined value.

7. The combination as set forth in claim 4 wherein the deceleration signal source comprises an orifice, a movable valve element registering with said orifice and assuming normally an orifice closing position, an inertia mass connected to said valve element and movable with said valve element to an orifice opening position in response to deceleration forces of the vehicle, an orifice switch valve connecting said speed pressure source to said accumulator, and a flow restricting orifice in said last named connection, one side of side switch valve being in fluid communication with said speed signal source, said accumulator being in fluid communication with the opposite side of said switch valve, said switch valve progressively opening said deceleration signal source orifice upon movement thereof against the opposing influence of the pressure of said speed signal source as regulated pressure of said accumulator overrules the influence of said speed signal on said switch valve.

8. The combination as set forth in claim 5 wherein the deceleration signal source comprises an orifice, a movable valve element registering with said orifice and assuming normally an orifice closing position, an inertia mass connected to said valve element and movable with said valve element to an orifice opening position in response to deceleration forces of the vehicle, an orifice switch valve connecting said speed pressure source to said accumulator, a flow restricting orifice in said last named connection, one side of said switch valve being in fluid communication with said speed signal source, said accumulator being in fluid communication with the opposite side of said switch valve, said switch valve progressively opening said deceleration signal source orifice upon movement thereof against the opposing influence of the pressure of said speed signal source as regulated pressure of said accumulator overrules the influence of said speed signal on said switch valve.

9. The combination as set forth in claim 6 wherein the deceleration signal source comprises an orifice, a movable valve element registering with said orifice and assuming normally an orifice closing position, an inertia mass connected to said valve element and movable with said valve element to an orifice opening position in response to deceleration forces of the vehicle, an orifice switch valve connecting said speed pressure source to said accumulator, a flow restricting orifice in said last named connection, one side of said switch valve being in fluid communication with said speed signal source, said accumulator being in fluid communication with the opposite side of said switch valve, said switch valve progressively opening said deceleration signal source orifice upon movement thereof against the opposing influence of the pressure of said speed signal source as regulated pressure of said accumulator overrules the influence of said speed signal on said switch valve.

10. The combination as set forth in claim 4 wherein the means for preloading said movable member comprises a pressure cylinder, a piston in said pressure cylinder, a pressure chamber defined in part by said cylinder, a connection between said pressure source and said chamber, a spring urging said piston in a direction that tends to decrease the effective size of said chamber, said piston being stroked under the influence of the pressure of said source against the force of said spring, and means for subjecting said movable member to the pressure in said chamber to bias the same normally to a static, inactive position.

11. The combination as set forth in claim 5 wherein the means for preloading said movable member comprises a pressure cylinder, a piston in said pressure cylinder, a pressure chamber defined in part by said cylinder, a connection between said pressure source and said chamber, a spring urging said piston in a direction that tends to decrease the effective size of said chamber, said piston being stroked under the influence of the pressure of said source against the force of said spring, and means for subjecting said movable member to the pressure in said chamber to bias the same normally to a static, inactive position.

12. The combination as set forth in claim 6 wherein the means for preloading said movable member comprises a pressure cylinder, a piston in said pressure cylinder, a pressure chamber defined in part by said cylinder, a connection between said pressure source and said chamber, a spring urging said piston in a direction that tends to decrease the effective size of said chamber, said piston being stroked under the influence of the pressure of said source against the force of said spring, and means for subjecting said movable member to the pressure in said chamber to bias the same normally to a static, inactive position.

13. The combination as set forth in claim 1 wherein said actuator moves said release valve to a first position corresponding to normal deceleration of said vehicle during braking and to a second position corresponding to a lack of deceleration of said vehicle during vehicle braking, said release valve forming a connection between one side of said movable member and the exhaust region when it assumes said first position and forming a connection between the pressure source and said one side of said movable member when it assumes a second position.

14. The combination as set forth in claim 2 wherein said actuator moves said release valve to a first position corresponding to normal deceleration of said vehicle during braking and to a second position corresponding to a lack of deceleration of said vehicle during vehicle braking, said release valve forming a connection between one side of said movable member and the exhaust region when it assumes said first position and forming a connection between the pressure source and said one side of said movable member when it assumes a second position.

15. The combination as set forth in claim 3 wherein said actuator moves said release valve to a first position corresponding to normal deceleration of said vehicle during braking and to a second position corresponding to a lack of deceleration of said vehicle during vehicle braking, said release valve forming a connection between one side of said movabe member and the exhaust region when it assumes said first position and forming a connection between the pressure source and said one side of said movable member when it assumes a second position.

16. The combination as set forth in claim 1 wherein said actuator moves said release valve to a first position corresponding to normal deceleration of said vehicle during braking and to a second position corresponding to a lack of deceleration of said vehicle during braking, said release valve establishing a fluid connection between one side of said movable member and said pressure source when it assumes said first position thereby establishing brake pressure force reaction on said movable member, and said release valve establishing a fluid connection between said one side of said movable member and the exhaust region when it assumes a second position whereby said compensator element is shifted under the influence of fluid brake pressure to reduce the effective braking effort of said wheel brake cylinders regardless of the relative increase in the braking pressure in said master brake cylinder.

17. The combination as set forth in claim 2 wherein said actuator moves said release valve to a first position corresponding to normal deceleration of said vehicle during vehicle braking and to a second position corresponding to a lack of deceleration of said vehicle during vehicle braking, said release valve establishing a fluid connection between one side of said movable member and said pressure source when it assumes said first position thereby establishing brake pressure force reaction on said movable member, and said release valve establishing a fluid connection between said one side of said movable member and the exhaust region when it assumes a second position whereby said compensating element is shifted under the influence of fluid brake pressure to reduce the effective braking effort of said wheel brake cylinders regardless of the relative increase in the braking pressure in said master brake cylinder.

18. The combination as set forth in claim 3 wherein said actuator moves said release valve to a first position corresponding to normal deceleration of said vehicle during braking, said release valve establishing a fluid connection between one side of said movable member and said pressure source when it assumes said first position thereby establishing brake pressure force reaction on said movable member, and said release valve establishing a fluid connection between said one side of said movable member and the exhaust region when it assumes a second position whereby said compensating element is shifted under the influence of fluid brake pressure to reduce the effective braking effort of said wheel brake cylinders regardless of the relative increase in the braking pressure in said master brake cylinder.

19. The combination as set forth in claim 16 wherein the opposite side of said movable member is continuously in communication with exhaust region.

20. The combination as set forth in claim 17 wherein the opposite side of said movable member is continuously in communication with exhaust region.

21. The combination as set forth in claim 18 wherein the opposite side of said movable member is continuously in communication with exhaust region.

References Cited
UNITED STATES PATENTS

| | | |
|---|---|---|
| 3,026,148 | 3/1962 | Ruof. |
| 3,260,555 | 7/1966 | Packer. |
| 3,260,556 | 7/1966 | Packer. |
| 3,338,637 | 8/1967 | Harned et al. |

DUANE A. REGER, Primary Examiner

U.S. Cl. X.R.

188—181